United States Patent
Weyna

(10) Patent No.: US 8,152,368 B2
(45) Date of Patent: Apr. 10, 2012

(54) COVER FOR TEMPERATURE SENSOR

(75) Inventor: Paul V. Weyna, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 553 days.

(21) Appl. No.: 12/303,647

(22) PCT Filed: Jun. 13, 2006

(86) PCT No.: PCT/US2006/023019
§ 371 (c)(1),
(2), (4) Date: Dec. 5, 2008

(87) PCT Pub. No.: WO2007/145624
PCT Pub. Date: Dec. 21, 2007

(65) Prior Publication Data
US 2010/0177802 A1  Jul. 15, 2010

(51) Int. Cl.
*G01K 1/00* (2006.01)
*G01K 13/00* (2006.01)
(52) U.S. Cl. .................. 374/147; 374/208
(58) Field of Classification Search ............. 374/147, 374/208
See application file for complete search history.

(56) References Cited

U.S. PATENT DOCUMENTS

| | | | |
|---|---|---|---|
| 2,967,429 A | 1/1961 | Taylor | |
| 4,651,535 A * | 3/1987 | Alsenz | 62/225 |
| 5,040,380 A * | 8/1991 | Gregory | 62/225 |
| 7,824,101 B2 * | 11/2010 | Kloiber et al. | 374/147 |
| 2001/0053172 A1 | 12/2001 | Sakowsky et al. | |
| 2002/0041621 A1 | 4/2002 | Faries, Jr. et al. | |
| 2002/0064206 A1 * | 5/2002 | Gysling et al. | 374/147 |
| 2003/0055603 A1 * | 3/2003 | Rossi et al. | 702/185 |
| 2004/0151230 A1 * | 8/2004 | Das et al. | 374/141 |
| 2005/0132731 A1 * | 6/2005 | Nakamura et al. | 62/160 |
| 2005/0284164 A1 * | 12/2005 | Ohta | 62/228.3 |
| 2006/0090490 A1 * | 5/2006 | Grimm et al. | 62/181 |

OTHER PUBLICATIONS

International Search Report and Written Opinion mailed Jan. 4, 2007 (11 pgs.).
International Preliminary Report on Patentability mailed May 21, 2008 (4 pgs.).

* cited by examiner

*Primary Examiner* — Lisa Caputo
*Assistant Examiner* — Mirellys Jagan
(74) *Attorney, Agent, or Firm* — Cantor Colburn LLP

(57) ABSTRACT

A cover for the bulb of a thermal expansion valve is comprised of two halves of an insulative body that are wrapped around the bulb and associated outlet types in clamshell fashion to encapsulate the combination. Internal and external flaps are hingedly connected along their longitudinal edges to permit access for inspection purposes, and the external flap is secured to the internal flap by Velcro. A tongue structure on the outer surface of the body fits into grooves on the inner surface of the outer flap to seal the cover against the entry of moisture. The two halves are secured in place at their ends by way of bands.

21 Claims, 3 Drawing Sheets

COVER FOR TEMPERATURE SENSOR

BACKGROUND OF THE INVENTION

This invention relates generally to refrigeration systems and, more particularly, to a method and apparatus for insulating and protecting a temperature sensor in a refrigeration system.

In air conditioning and refrigeration systems it is common to maintain a certain degree of superheat in the refrigerant passing from the evaporator to the compressor in order to protect the compressor from damage that can occur by liquid refrigerant passing therethrough. This is accomplished by using a thermal expansion valve upstream of the evaporator coil and an associated temperature sensor or bulb for sensing the temperature of the refrigerant passing from the evaporator coil.

In order for the bulb to provide accurate temperature readings, it is necessary to isolate a bulb and its connection to the outlet line such that water and air currents are not present in the area to provide an inaccurate temperature reading. This has generally been accomplished by providing some kind of protective cover over the area in which the bulb is secured to the outlet line. The most common type of insulation that is provided around the bulb is that of first using a sticky asphalt sheet called Prestite that is applied around the bulb such that no voids are present for water or air to enter into. The area is then wrapped with a tubular neoprene insulation, which is then covered with vinyl tape. Finally, the combination is covered with aluminum tape. The problems with this approach are twofold. First, the quality of the resulting insulation is dependent on the ability of the technician applying it, and there is no certainty that the process will be inadequate. Secondly, in order for the serviceman to have access to the bulb for inspection and/or maintenance purposes, it is necessary to remove each of these layers and then reapply them when the process is completed. The removal is difficult, especially the Prestite, and the reapplication results are inconsistent, as mentioned hereinabove. Both are very labor intensive and expensive.

Other types of temperature sensors are also used to sense refrigerant temperatures in various lines of a refrigeration system for purposes of control and/or protection of the system. These sensors are subject to the same problems as discussed hereinabove.

SUMMARY OF THE INVENTION

Briefly, in accordance with one aspect of the invention, a molded foam cover is wrapped around the bulb that is attached to the outlet line, and the cover is secured in place so as to insulate the bulb and protect it from exposure to moisture and air currents.

By another aspect of the invention, a first hinged flap is provided so as to provide easy access to the insulation for inspection and maintenance purposes. A second hinged flap is provided in overlapping relationship with the first flap and secured by way of a Velcro fastener.

By yet another aspect of the invention, the cover is formed in a clamshell arrangement, with two halves that are folded over the outlet line so as to come together to envelop the installed bulb, and bands are wrapped around each end to secure it in place.

In accordance with another aspect of the invention, tongue and grooves are provided to present a seal against the entry of moisture into the cover.

In the drawings as hereinafter described, a preferred embodiment is depicted; however, various other modifications and alternate constructions can be made thereto without departing from the spirit and scope of the invention.

DETAILED DESCRIPTION OF THE INVENTION

Figure 1:
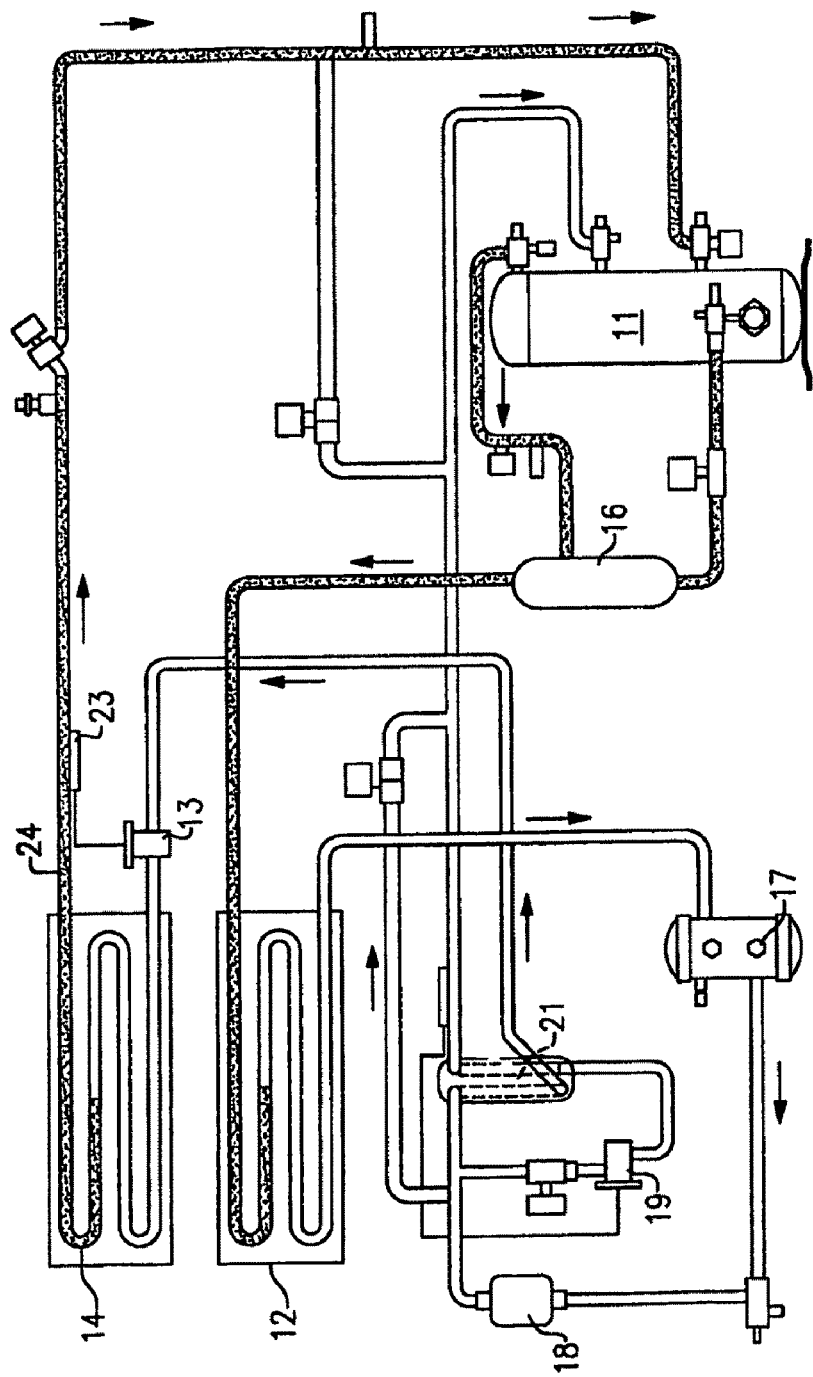
FIG. 1 is a schematic illustration of a refrigerant system with the present invention incorporated therein.

FIG. 1 is a schematic illustration of a transport refrigeration system of the type to which the present invention is applicable. Connected in typical serial flow relationship are a compressor 11, a condenser 12, an expansion device or thermal expansion valve (TXV) 13 and an evaporator coil 14. The refrigerant is caused by the compressor 11 to flow through the system in a well known manner.

Other components that are normally included in the system are an oil separator 16, a receiver 17, a filter dryer 18, an economizer TXV 19, and an economizer heat exchanger 21. The oil separator 16 functions to separate the oil from the compressed refrigerant so it can return to the compressor 11. The receiver stores refrigerant for use in low temperature operation. The filter dryer 18 removes moisture and impurities from the refrigerant. The economizer is used to provide frozen range and pull down capacity of the unit by subcooling the liquid refrigerant entering the evaporator TXV 13 when required.

The TXV 13 has a variable orifice that receives the liquid refrigerant and passes it on to the evaporator 14 in an expanded, or vapor, form. The size of the variable orifice in the TXV 13 is determined by a temperature sensor or a TXV bulb 23 which is attached to the evaporator outlet line 24 in such a way as to sense the temperature of the refrigerant passing from the evaporator 14 and to activate the TXV 13 in response thereto. In this way, the TXV 13 maintains a constant superheat at the coil outlet regardless of load conditions.

Figure 2:
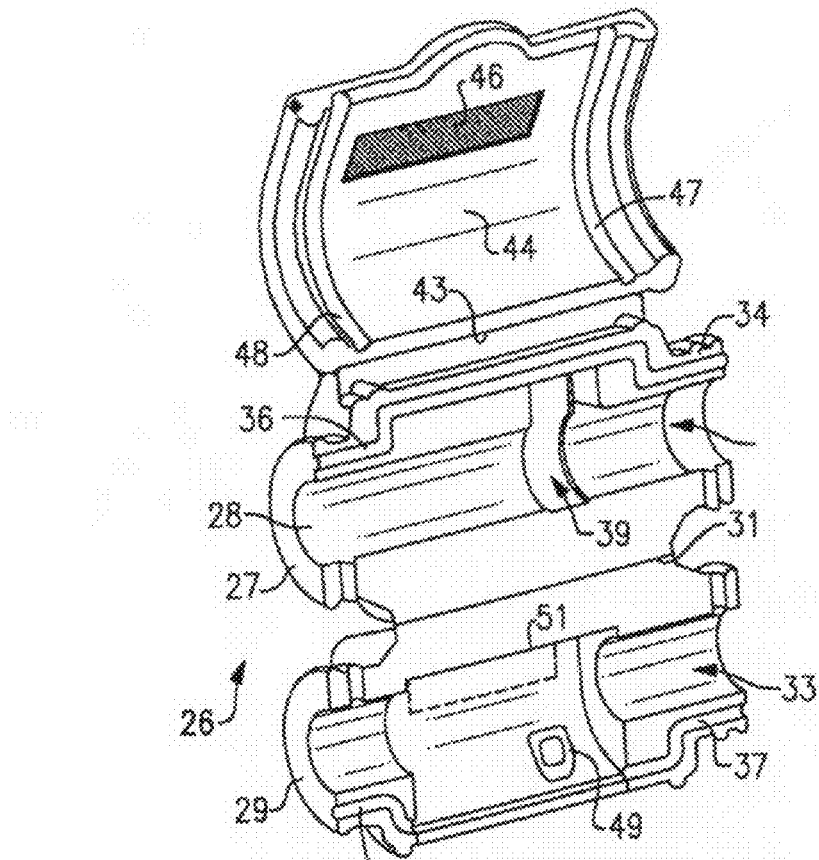
FIG. 2 is a perspective view of the cover in accordance with one aspect of the present invention.
Figure 3:
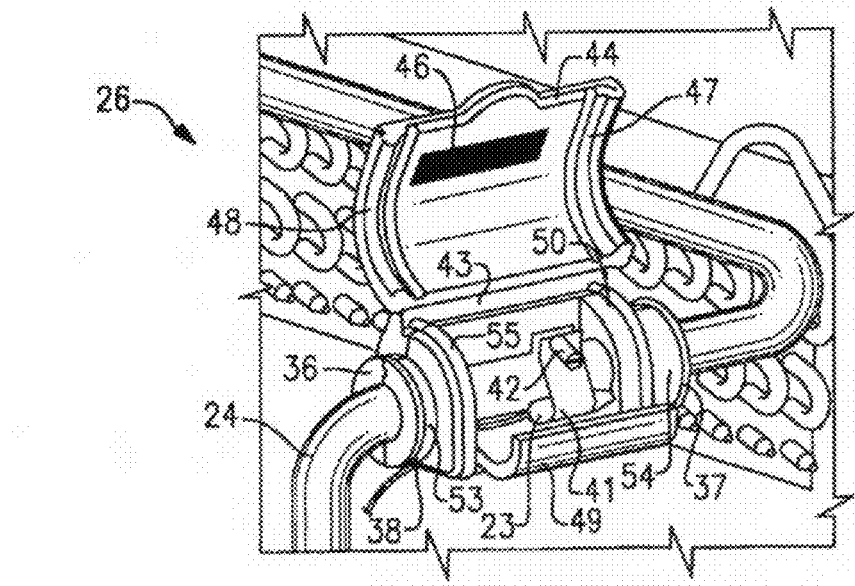
FIG. 3 is a perspective view of the cover as installed and in the open position.

The cover 26 of the present invention is shown in the uninstalled condition in FIG. 2 and in the installed condition in FIG. 3. It comprises an elongate body 27 formed of half cylindrical elements 28 and 29 joined at a common edge 31. Each of the half cylindrical elements 28 and 29 have a hemi-cylindrical passage extending longitudinally therethrough, as shown at 32 and 33, respectively. A neck of reduced diameter is disposed on each end of each half, with necks 34 and 36 being disposed on half 28 and necks 37 and 38 being disposed on half 29. The cover is secured to the evaporator outlet line by way of these necks in a manner to be described hereinafter.

A hollowed out area or cavity 39 is provided in the half 28 and portions of half 29 for purposes of accommodating the bulb 23 and a securing band 41 and fastener 42 as will be seen in FIG. 3. Attached to one edge 43 of half 28 is an arcuate flap 44, which will be referred to as a large or outer flap, having a Velcro element 46 on its inner side, as well as grooves 47 and 48 extending along its end edges. The flap 44 is intended to be folded over the half 29 for closure and sealing purposes with tongue structure 50 and 55 fitting into the respective grooves 47 and 48 to provide a seal against the entry of moisture into the cover 26.

The half 29 also has a flap, which will be referred to as a smaller or inner flap 49, which can be bent back at its edge 51 to provide an opening in half 29 for purposes of access. A second Velcro element 52 is provided on its outer side near the edge 51.

To install the cover 26 in place over the evaporator outlet line 24, the TXV bulb 23 and its securing components 41 and 42 as shown in FIG. 3, the two halves 28 and 29 are wrapped around the combination, in clam shell style with the respective edges coming together as shown. The mating necks 36 and 38 then come together, and the mating necks 34 and 37 come together, to form cylinders which then can be secured in place by bands 53 and 54 that are placed therearound. The bands 53 and 54 are semi-permanent in that they need not be removed for inspection purposes but may be easily removed and replaced if it is necessary to remove the entire cover 26 for any reason.

Figure 4:
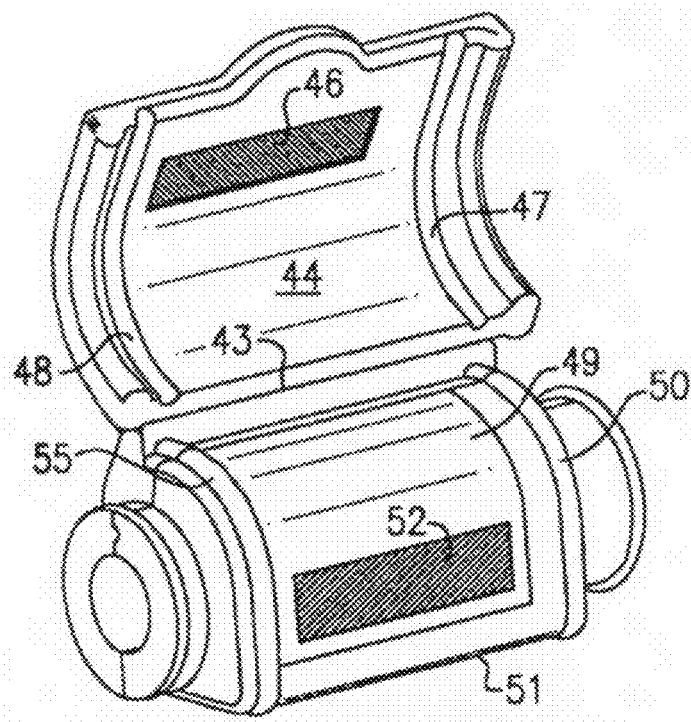
FIG. 4 is a view thereof in a partially closed position.
Figure 5:
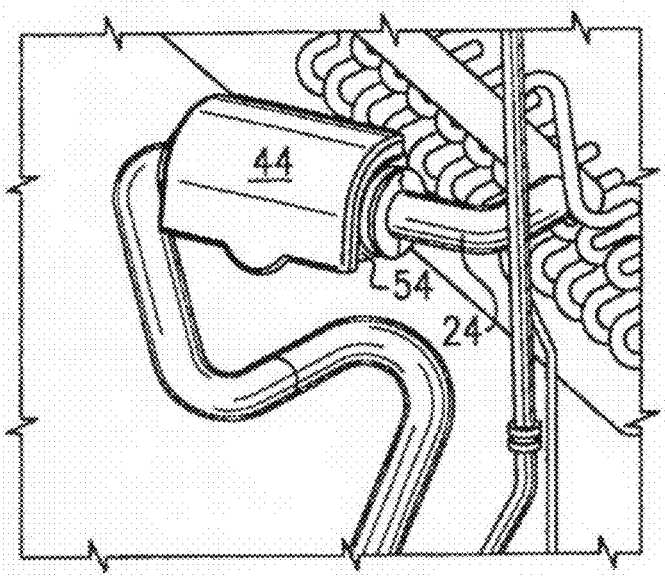
FIG. 5 is a view thereof in the closed position.

Considering now the issue of accessibility, both the outer flap 44 and the inner flap 49 are shown in folded back positions to provide easy and full access to the TXV bulb 23 and its securing components 41 and 42. When it is desired to close the cover 26, one must simply fold in the inner flap 49 as shown in FIG. 4 and then fold the outer flap 44 in overlapping relationship with the inner flap 49 with the two Velcro elements 46 and 52 engaging to hold the outer flap 44 in its closed position. It should be recognized when the inner flap 49 and the outer flap 44 are in their closed position, the tongue elements 50 and 55 of the half 29 fit into the grooves 47 and 48 on the inner side of the outer flap 44 so as to provide a seal against entry of air, moisture and dirt that might otherwise migrate into the internal space defined by the cover 26.

The cover 26 may be composed of any suitable material that provides good insulating characteristics and preferably one that is resistant to moisture. A material that has been found to be most suitable is a closed cell molded foam material which is available from a U.K. company Zotefoams PLC as a tradename LD 45. The bands 53 and 54 can be made of any suitable plastic or metal material.

Although the invention has been described in terms of a cover for a bulb of a TXV, it may as well be applicable to any other type of sensor that is attached to a refrigerant line for the sensing of temperatures for purposes of control or protection of the system. For example, it may be used to cover a thermistor that is applied to a discharge line of a compressor for the purpose of sensing high discharge temperatures and sending a responsive signal to a microprocessor to shut down the system. Or it may be used to cover a thermistor that is applied to the suction line to sense temperatures for the purpose of calculating the degree of superheat, for example.

I claim:

1. A cover for a temperature sensor attached to a refrigerant line of a refrigeration system comprising:
    an elongate body with a generally cylindrical opening formed therein so as to allow the refrigerant line to pass therethrough, said elongate body including an inner flap that can be folded away to expose the temperature sensor for inspection purposes and an outer flap that is folded over said inner flap and which can be unfolded to expose said inner flap; and
    a cavity formed in said body in contiguity with said cylindrical opening for containing said sensor, said cover forming a water proof enclosure for protecting said sensor from exposure to the elements wherein said temperature sensor comprises a bulb attached to the refrigerant line at an outlet line of an evaporator, with sensed temperature being provided to a thermal expansion valve at an inlet line of the evaporator.

2. A cover as set forth in claim 1 wherein said elongate body is generally cylindrical in form.

3. A cover as set forth in claim 1 wherein said cavity is sufficiently large to accommodate and contain a clamping mechanism as well as the temperature sensor.

4. A cover as set forth in claim 1 wherein said inner flap is hinged along a longitudinal edge thereof.

5. A cover as set forth in claim 1 wherein said elongate body is comprised of two halves that are hinged at a common edge such that the two halves can be folded together in clamshell fashion to encapsulate the temperature sensor.

6. A cover as set forth in claim 1 and including a band surrounding said elongate body at each longitudinal end thereof so as to secure it in its installed position.

7. A cover for a temperature sensor attached to a refrigerant line of a refrigeration system comprising:
    an elongate body with a generally cylindrical opening formed therein so as to allow the refrigerant line to pass therethrough;
    a cavity formed in said elongate body in contiguity with said cylindrical opening for containing said temperature sensor;
    an inner flap that can be folded away to expose said temperature sensor for inspection purposes; and
    an outer flap that is folded said inner flap and which can be unfolded to expose said inner flap, said cover forming a water proof enclosure for protecting said temperature sensor from exposure to the elements.

8. A cover as set forth in claim 7 wherein said inner and outer flaps unfold in opposite directions.

9. A cover as set forth in claim 7 wherein said outer flap is secured to said inner flap by way of Velcro.

10. A cover as set forth in claim 7 wherein said outer flap includes laterally extending groove elements at its end edges and said elongate body includes laterally extending tongue element at its ends and further, wherein said tongue elements fit into said groove elements when said outer flap is closed.

11. A cover for a temperature sensor attached to a refrigerant line comprising:
    a pair of elongate body members composed of an insulative material and attached at a common edge and foldable together in a clam shell manner to encapsulate the temperature sensor and an associated portion of the refrigerant line, each of said elongate body members having an integral neck portion at its end with said neck portions also being foldable together in a clam shell manner so as to form a neck at each end surrounding the refrigerant line; and a band on each end to surround the respective necks and secure them in place wherein the temperature sensor comprises a bulb attached to the refrigerant line at an outlet line of an evaporator with sensed temperature being provided to a thermal expansion valve at an inlet line of the evaporator.

12. A cover as set forth in claim 11 wherein said pair of elongate body members includes a cavity for accommodating the temperature sensor.

13. A cover as set forth in claim 11 wherein said elongate body is comprised of two halves that are hinged at a common edge such that the two halves can be folded together in clamshell fashion to encapsulate the temperature sensor.

14. A cover as set forth in claim 11 and including a band surrounding said elongate body at each longitudinal end thereof so as to secure it in its installed position.

15. A cover as set forth in claim 11 wherein said cover is composed of a closed cell, molded foam material.

16. A cover as set forth in claim 11 wherein said elongate body includes an inner flap that can be folded away to expose the temperature sensor for inspection purposes.

17. A cover as set forth in claim 16 wherein said inner flap is hinged along a longitudinal edge thereof.

18. A cover as set forth in claim 16 and including an outer flap that is folded over said inner flap and which can be unfolded to expose said inner flap.

19. A cover as set forth in claim 18 wherein said inner and outer flaps unfold in opposite directions.

20. A cover as set forth in claim 18 wherein said outer flap is secured to said inner flap by way of Velcro.

21. A cover as set forth in claim 18 wherein said outer flap includes laterally extending grooves at its end edges and said elongate body includes laterally extending tongues at its ends and further, wherein said tongues fit into said grooves when said outer flap is closed.

\* \* \* \* \*